US008594653B2

(12) United States Patent
Zeilingold et al.

(10) Patent No.: US 8,594,653 B2
(45) Date of Patent: *Nov. 26, 2013

(54) SYSTEM AND METHODS FOR REMOTELY UPGRADING SOFTWARE APPLICATIONS

(75) Inventors: Daphna Zeilingold, San Diego, CA (US); Philippe Bergman, San Diego, CA (US); Sapna Mehta, San Diego, CA (US); Vandana Gopal, San Diego, CA (US); Wilfred Sakai, Poway, CA (US); Lawrence Alldredge, La Jolla, CA (US); Drew Kerwin, San Diego, CA (US); Daniel A. Deninger, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/461,396

(22) Filed: May 1, 2012

(65) Prior Publication Data

US 2012/0214474 A1 Aug. 23, 2012

Related U.S. Application Data

(63) Continuation of application No. 11/831,879, filed on Jul. 31, 2007, now Pat. No. 8,170,540.

(60) Provisional application No. 60/843,793, filed on Sep. 11, 2006, provisional application No. 60/843,344, filed on Sep. 7, 2006.

(51) Int. Cl.
*H04M 3/00* (2006.01)

(52) U.S. Cl.
USPC .......................... 455/419; 455/418; 455/420

(58) Field of Classification Search
USPC ......................................... 455/418, 419, 420
See application file for complete search history.

(56) References Cited

U.S. PATENT DOCUMENTS 6,269,080 B1 7/2001 Kumar
6,687,901 B1 2/2004 Imamatsu
(Continued)

FOREIGN PATENT DOCUMENTS

| EP | 1528723 | 5/2005 |
| EP | 1648148 | 4/2006 |
| EP | 1657896 | 5/2006 |
| WO | WO0131846 A2 | 5/2001 |

OTHER PUBLICATIONS

International Search Report—PCT/US2007/077522—ISA/EPO—Jul. 2, 2008.

(Continued)

Primary Examiner — Christopher M Brandt
(74) Attorney, Agent, or Firm — Gerald P. Joyce, III

(57) ABSTRACT

The present invention includes a system and methods for upgrading software on a mobile terminal. The system includes a network management computer (NMC) adapted to receive a plurality of software upgrades and to transmit one of the plurality of software upgrades to one of a plurality of mobile terminals through a satellite link. The mobile terminal can include an upgradeable component, which in turn includes a detachable device descriptor (DDD) corresponding to operating characteristics of the upgradeable component. According to the present invention, the NMC is adapted to transmit the one of a plurality of software upgrades to the mobile terminal in response to the DDD of the upgradeable component. Methods employing similar features and advantages are also disclosed herein.

40 Claims, 6 Drawing Sheets

(56) References Cited

U.S. PATENT DOCUMENTS

| | | | |
|---|---|---|---|
| 6,820,259 B1 | 11/2004 | Kawamata et al. | |
| 6,917,800 B1 | 7/2005 | Rychlak | |
| 6,992,991 B2 | 1/2006 | Duske, Jr. et al. | |
| 7,065,347 B1 | 6/2006 | Vikse et al. | |
| 7,461,373 B2* | 12/2008 | Herle et al. | 717/171 |
| 7,506,053 B1 | 3/2009 | Qin | |
| 7,526,800 B2* | 4/2009 | Wright et al. | 726/11 |
| 8,170,540 B2 | 5/2012 | Zeilingold et al. | |
| 2001/0029178 A1 | 10/2001 | Criss et al. | |
| 2003/0022663 A1 | 1/2003 | Rajaram et al. | |
| 2003/0176165 A1* | 9/2003 | Gosewehr | 455/9 |
| 2003/0186689 A1 | 10/2003 | Herle et al. | |
| 2004/0152457 A1 | 8/2004 | Goldstein et al. | |
| 2004/0181790 A1 | 9/2004 | Herrick | |
| 2005/0033829 A1 | 2/2005 | Oommen | |
| 2005/0245248 A1 | 11/2005 | Rajaram | |
| 2006/0005016 A1 | 1/2006 | Lee et al. | |
| 2006/0094400 A1* | 5/2006 | Beachem et al. | 455/410 |
| 2006/0195436 A1 | 8/2006 | Levesque et al. | |
| 2006/0293036 A1* | 12/2006 | Zhou | 455/415 |
| 2007/0106749 A1 | 5/2007 | Melchione et al. | |
| 2007/0169073 A1 | 7/2007 | O'Neill et al. | |
| 2008/0003991 A1* | 1/2008 | Sievers et al. | 455/418 |

OTHER PUBLICATIONS

Written Opinion—PCT/US2007/077522, International Search Authority European Patent Office—Jul. 2, 2008.

\* cited by examiner

SYSTEM AND METHODS FOR REMOTELY UPGRADING SOFTWARE APPLICATIONS

CROSS-REFERENCE TO RELATED APPLICATIONS

The present Application is a continuation of U.S. patent application Ser. No. 11/831,879 entitled "SYSTEM AND METHODS FOR REMOTELY UPGRADING SOFTWARE APPLICATIONS" which claims priority to Provisional Application No. 60/843,344 entitled "OVER THE AIR SOFTWARE UPGRADE" filed Sep. 7, 2006, and to Provisional Application No. 60/843,793 entitled "OVER THE AIR SOFTWARE UPGRADE FOR MOBILE PLATFORMS" filed Sep. 11, 2006, which were both assigned to the assignee hereof.

FIELD OF THE PRESENT INVENTION

The present invention relates generally to communications, and more specifically to a novel and improved system and methods for remotely updating software on one or more mobile terminals.

BACKGROUND OF THE PRESENT INVENTION

The increasing sophistication of mobile electronic devices is related in no small part to the increasing sophistication of the software that operates on these devices. Fortunately, there are consistently significant improvements in software development that only improves the performance and desirability of these mobile devices. Unfortunately, software products in general are often subject to updates, upgrades and various modifications that require the installation of a new software product on the mobile device.

Currently, some cellular carriers provide software upgrades over the air by transmitting the software to the devices through the cellular network. One example of this procedure is described in U.S. Pat. No. 7,065,347 to Vikse, et al. The Vikse patent discloses distributing, en masse, a computer program to a number of cellular phones through the cellular network. The cellular phones receive the software upgrade and write it to their local memory device, after which time it is operable on the cellular phone. However, the cellular network methodology is unsuitable for a number of other types of devices that may not have cellular connections.

Secondly, a number of mobile platforms have multiple devices, each of which can have its own memory, processor, operating system and the like, and all of which may not require and/or be able to receive a particular software update. Lastly, many mobile platform users have traditionally been upgraded manually. Manual upgrades can be a tedious and expensive process, and users have avoided getting manual software upgrades, which only multiplies the number of software versions in the field at any given time. The upgrade mechanism, therefore, needs to accommodate upgrading from different base version to the latest. With so many software versions in the field, the proposed solution by Vikse is simply not operable for a host of mobile platforms.

Therefore, there is a need in the art for a system and method for upgrading software over a satellite link that makes efficient use of the bandwidth and data rate restrictions of satellite communications while being adaptable enough to handle multiple versions of software and multiple types of mobile devices.

SUMMARY OF THE PRESENT INVENTION

Accordingly, the present invention includes a system and methods for upgrading software on a mobile terminal. The system includes a network management computer (NMC) adapted to receive a plurality of software upgrades and to transmit one of the plurality of software upgrades to one or to a group of mobile terminals through a network, such as satellite link or a cellular wireless network, and a mobile terminal which communicates with the NMC through the network. The mobile terminal can be adapted to execute one or more software programs. The mobile terminal includes one or more upgradeable components, each upgradeable component is defined by a detachable device descriptor (DDD) corresponding to operating characteristics of the upgradeable component. According to the present invention, the NMC is adapted to transmit one of a plurality of software upgrades to the mobile terminal, in accordance with the DDD of the upgradeable component. According to the present invention, the NMC is adapted to transmit one of a plurality of software upgrades to the mobile terminal, in accordance with the DDD of the upgradeable component.

The present invention also includes a first method for upgrading software on a mobile terminal. The first method includes the steps of providing a software upgrade operable on a mobile terminal, wherein the mobile terminal including an upgradeable component, and providing a DDD corresponding to the operating characteristics of the upgradeable component. The first method also includes the steps of grouping the mobile terminals into groups including one or more mobile terminals based on the DDD of the upgradeable component. The method includes steps of providing SW upgrades to the NMC and designating their applicability to different DDDs. Finally, the method includes steps to transmit the applicable software upgrade to the group, based on the DDD that is common to its members.

The present invention further includes a second method for upgrading software on a mobile terminal including an upgradeable component. The second method includes the steps of providing the mobile terminal with a DDD corresponding to operating characteristics of the upgradeable component and populating a database of the mobile terminal upgradeable component with original data corresponding to the existing software on the upgradeable component. The second method also includes the steps of grouping the mobile terminal into a group in accordance with the DDD of the upgradeable component and comparing the original data of the upgradeable component to upgrade data corresponding to the group to which the mobile terminal belongs. Finally, the second method includes the step of providing a software upgrade to the mobile terminal in response to the original data and the upgrade data being unsynchronized.

The present invention further includes a third method for upgrading software on a mobile terminal. The third method includes the step of providing a mobile terminal including a first upgradeable component. The first upgradeable component can be any upgradeable processing platform, including but not limited to an interface unit, a data modem, a personal digital assistant, a GPS receiver, a navigation system, a cellular mobile telephone, a satellite modem, or a display. Additionally, the first upgradeable component includes a first DDD corresponding to operating characteristics of the first upgradeable component. Another step of the third method is grouping the mobile terminal into a first group corresponding to the DDD of the first upgradeable component.

The third method also includes providing a replacement upgradeable component in the mobile terminal as a replacement for the first upgradeable component. The replacement upgradeable component can also be (but not limited to) an interface unit, a data modem, a personal digital assistant, a GPS receiver, a navigation system, a cellular mobile telephone, a satellite modem, or a display. The replacement upgradeable component also contains a second DDD corresponding to operating characteristics of the replacement upgradeable component.

Finally, upon replacement of the first upgradeable component by the replacement upgradeable component, the third method includes transferring the mobile terminal into a second group corresponding to the second DDD, and upgrading the software on the mobile terminal in response to the second group being different than the first group.

A fourth method for upgrading software on a mobile terminal including an upgradeable component includes the steps of providing the mobile terminal with a detachable device descriptor (DDD) corresponding to operating characteristics of the upgradeable component, and providing beta software operable on the upgradeable component. The fourth method also includes the steps of grouping mobile terminals that are part of a Beta test into a group, and directing upgrades to the Beta version to that group.

Further features and advantages of the present invention are described in detail below in terms of its preferred embodiments and example modes of operation with reference to the following Figures.

DETAILED DESCRIPTION OF THE PREFERRED EMBODIMENTS

The present invention is described below in terms of its preferred embodiments with reference to the aforementioned Figures. Those skilled in the art will recognize that the following detailed description is exemplary in nature, and that the scope of the present invention is defined by the appended claims.

As used throughout the present application, the term software upgrade includes one or more new software components, a new version of one or more old software component, or any combination of one or more new software components and one or more versions of an old software component.

Figure 1:
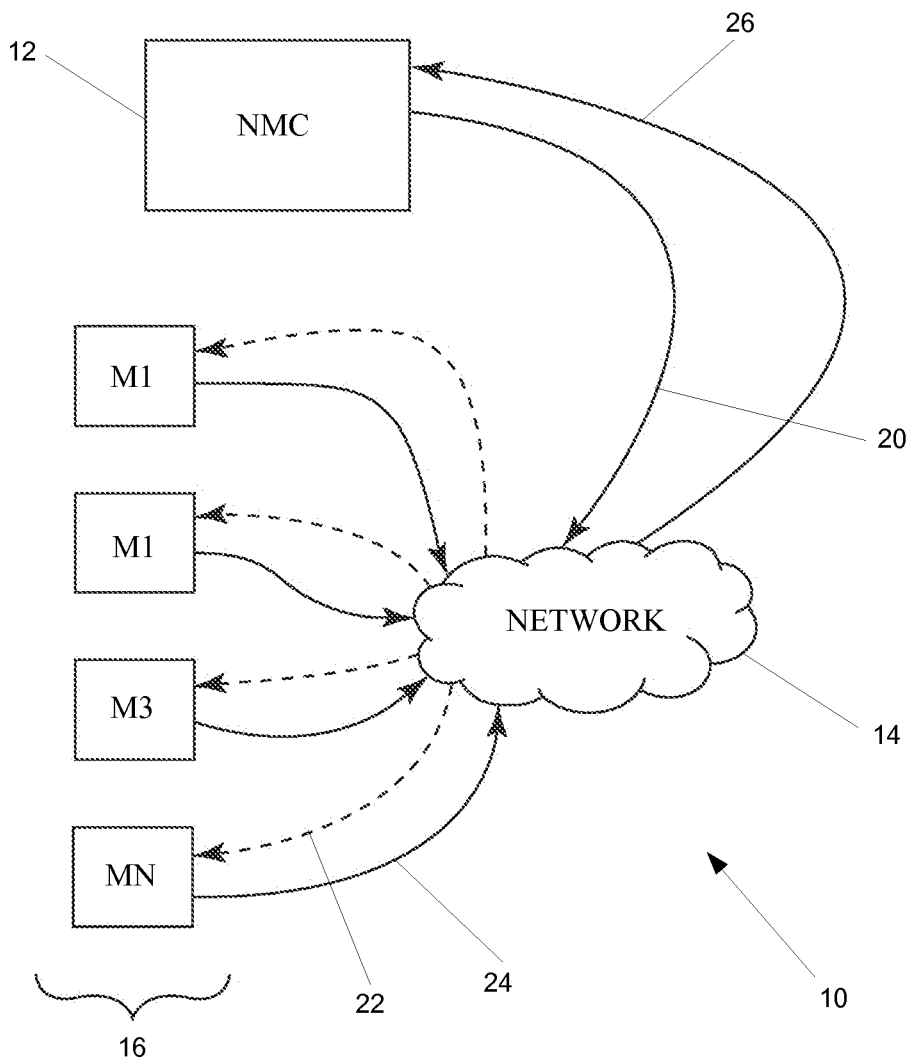
FIG. 1 is a schematic block diagram of a system for upgrading software on a mobile terminal in accordance with a preferred embodiment of the present invention.

The present invention includes a system for upgrading software on a mobile terminal or a group of mobile terminals, a preferred embodiment of which is shown in FIG. 1. The system 10 of the preferred embodiment includes a network management computer (NMC) 12 that is adapted to receive a plurality of software upgrades. The NMC 12 is further adapted to transmit one of the plurality of software upgrades to one of a plurality of mobile systems 16 through a satellite link 14. Multicast can be utilized to send the upgrade to a group of mobile terminals in order to make efficient use of the satellite link resources mentioned above.

Each of the mobile terminals 16 is communicable with the NMC 12 through the satellite link 14, and each of the mobile terminals 16 further includes one or more upgradeable components that are adapted to execute one or more software programs. Each upgradeable component included in the mobile terminal 16 contains a detachable device descriptor (DDD) that corresponds to the operating characteristics of the upgradeable component. In operation, the NMC 12 is adapted to transmit one of the plurality of software upgrades to the mobile terminals 16. The software upgrade that is transmitted is compatible with the DDD of the upgradeable component, thereby eliminating superfluous, redundant and/or unnecessary transmissions of software upgrades over the satellite link 14. As used herein, the term DDD can include for example designations for a hardware configuration, an operating system, a memory configuration, a processing configuration, or any combination thereof. Each upgradeable component that forms the mobile terminal 16 can derive its own DDD, thus a mobile terminal 16 can be defined in part by one or more DDD's associated with its one or more upgradeable components, as described below. The mobile terminal 16 can be is adapted to communicate its DDD to the NMC when it is initialized or when the DDD changes.

In a first variation of the system 10 of the preferred embodiment, the upgradeable component can be, without limitation, an interface unit, a data modem, a personal digital assistant (PDA), a GPS receiver, a navigation system, a cellular mobile telephone, a satellite modem or a display. Accordingly, the mobile terminal 16 can include one or more of each upgradeable component, according to any combination or permutation of the various types of upgradeable components described herein. Thus, the mobile terminal 16 can include for example a navigation system, an interface unit, a display and a data modem, each of which define a unique DDD and are thus eligible for unique software upgrades from the NMC 12. The grouping of mobile terminals 16 and the transmission of the upgrades is done on a component by component basis, so a mobile terminal 16 can belong to several groups, one per upgradeable component.

In another variation of the system 10 of the preferred embodiment, each software upgrade includes a release manifest that includes a list of software components forming the software upgrade. The release manifest is usable by the NMC 12 to maintain current and accurate information regarding the software configuration of each of the plurality of software upgrades. The mobile terminal 16 can be adapted to receive the release manifest and compare it with an existing software package in order to determine the applicability and/or completeness of the software upgrade. In this manner, the mobile terminal 16 is adapted to have information as to whether or not it is in receipt of a recent, applicable software upgrade. If the release manifest shows software packages that the mobile terminal 16 does not have, then the mobile terminal 16 is not completely up to date and will not attempt to activate the new software. In another alternative, the mobile terminal 16 can be adapted to report to the NMC 12 the status of its software packages, and can thus instruct the NMC 12 to transmit or retransmit all or portions of the software upgrade that would complete the software package of the mobile terminal 16.

In a third variation of the system 10 of the preferred embodiment, each software upgrade can include an upgrade time, which includes the software release number, a time at which the software should be upgraded, and the DDD to which it applies. The upgrade time allows the mobile terminal 16 to determine the timeliness of the software upgrade. For example, if the upgrade time is in the future, then the mobile terminal 16 is adapted to refrain from executing the software upgrade until the predetermined time. If the upgrade time is in the past, then the mobile terminal 16 is adapted to execute the software upgrade at the nearest available time, which can be subject to other constraints such as whether one or more of the upgradeable devices is in use when the upgrade time is received.

If the DDD designated in the upgrade time and/or the DDD in the release manifest do not match the DDD of the upgradeable device, then the mobile terminal 16 is adapted to ignore the software upgrade. This is a safeguard against an incompatible package being activated on the mobile terminal 16. Similarly, in order to ensure the security and functionality of the software upgrade, the mobile terminal 16 can utilize a digital signature to authenticate the software upgrade.

The present invention also includes a method for upgrading software on a mobile terminal. In a first preferred embodiment, the method includes the step of providing a software upgrade operable on a mobile terminal, wherein the mobile terminal includes an upgradeable component as defined above. The method of the preferred embodiment further includes the steps of providing a DDD corresponding to the operating characteristics of the upgradeable component, grouping the mobile terminal into a group including one or more mobile terminals with the same DDD of the upgradeable component; and transmitting the software upgrade to the mobile terminal in response to the grouping of the mobile terminal.

The transmission of the software upgrade can be conducted, for example, through a satellite link. As above, the term DDD can include for example designation for a hardware configuration, an operating system, a memory configuration, a processing configuration, or any combination thereof. Each upgradeable component that forms the mobile terminal includes its own DDD, thus a mobile terminal can be defined in part by one or more DDD's associated with its one or more upgradeable components.

In a first variation of the method of the first preferred embodiment, the upgradeable component includes, without limitation, an interface unit, a data modem, a personal digital assistant (PDA), a GPS receiver, a navigation system, a cellular mobile telephone, a satellite modem or a display. The mobile terminal can include one or more of each upgradeable component, according to any combination or permutation of the various types of upgradeable components described herein. The mobile terminal can include for example a navigation system, an interface unit, a display and a data modem, each of which contains its own DDD and are thus eligible for unique software upgrades from the NMC.

In another variation of the method of the first preferred embodiment, the method includes the step of providing a release manifest including a list of software components forming the software upgrade. As noted above, the release manifest is usable by the NMC to maintain current and accurate information regarding the software configuration of each of the plurality of software upgrades. The method includes the step of receiving the release manifest at the mobile terminal and comparing it with an existing software package in order to determine the applicability and/or completeness of the software upgrade. In this manner, the mobile terminal is adapted to have information as to whether or not it is in receipt of a recent, applicable software upgrade. If the release manifest shows software packages that the mobile terminal does not have, then the mobile terminal is not completely up to date. In another alternative, the method can include the step of contacting the NMC by the mobile terminal to report the status of its existing software package, thus indicating to the NMC to transmit or retransmit all or portions of the software upgrade that would complete the software package of the mobile terminal.

In a third variation of the method of the first preferred embodiment, the method includes the step of providing an upgrade time and transmitting the upgrade time to the mobile terminal. As noted above, the upgrade time includes at least the software release number, a time at which the software should be upgraded, and the DDD to which it applies. The upgrade time allows the mobile terminal to determine the timeliness of the software upgrade. For example, if the upgrade time is in the future, then the mobile terminal is adapted to refrain from executing the software upgrade until the predetermined time. If the upgrade time is in the past, then the mobile terminal is adapted to execute the software upgrade at the nearest available time, which can be subject to other constraints such as whether one or more of the upgradeable devices is in use when the upgrade time is received.

If the DDD designated in the upgrade time and/or the DDD in the release manifest do not match the DDD of the upgradeable device, then the mobile terminal can perform the optional step of ignoring the software upgrade. In order to ensure the security and functionality of the software upgrade, the method can further include the step of utilizing a digital signature to authenticate the upgrade to the mobile terminal.

In another variation of the method of the first preferred embodiment, the method includes the step of monitoring an active state of the mobile terminal. As used herein, the term active state should be construed broadly to include both operational states as well as passive states, wherein one or more functions of an upgradeable component are in use thereby preventing a reboot of some or all of the upgradeable components of the mobile terminal. For example, a navigation system can be in a passive state that is nevertheless active because one or more features of the navigation system are functioning, such as communications with one or more GPS satellites. On the other hand, if these features of the navigation system are not functioning, then it can be said to be in a negative active state as defined herein.

Many types of upgradeable components must be rebooted after receiving a software upgrade, and it is desirable to perform the reboot when the mobile terminal is not in an active state. If adapted to do so, the mobile terminal will delay the reboot until the upgradeable component is no longer in an active state. Another alternative of the method of the present invention is to notify a user of the mobile terminal that a reboot of the mobile terminal is in process in response to a negative active state of the mobile terminal. In this manner, the user knows that some or all of the mobile terminal may be unusable during the reboot, and the user will not inadvertently cause the mobile terminal to go into an active state and thereby hamper the reboot process.

A second preferred embodiment of the method of the present invention includes the step of providing the mobile terminal with a detachable device descriptor (DDD) corresponding to operating characteristics of the upgradeable component. The method of the second preferred embodiment further includes the steps of populating a database of the mobile terminal with original data corresponding to the existing software on the upgradeable component and grouping the mobile terminal into a group based on the DDD of the upgradeable component. Additionally, the method of the second preferred embodiment includes the steps of comparing the original data of the upgradeable component to upgrade data corresponding to the group of the mobile terminal, and providing a software upgrade to the mobile terminal if the original data and the upgrade data are unsynchronized.

The provision of the software upgrade can be conducted, for example, through a satellite link. As above, the term DDD can include for example designation for a hardware configuration, an operating system, a memory configuration, a processing configuration, or any combination thereof. Each upgradeable component that forms the mobile terminal includes its own DDD, thus a mobile terminal can be defined in part by one or more DDD's associated with its one or more upgradeable components.

In a first variation of the method of the second preferred embodiment, the upgradeable component could be, without limitation, an interface unit, a data modem, a personal digital assistant (PDA), a GPS receiver, a navigation system, a cellular mobile telephone, a satellite modem or a display. The mobile terminal can include one or more of each upgradeable component, according to any combination or permutation of the various types of upgradeable components described herein. The mobile terminal can include for example a navigation system, an interface unit, a display and a data modem, each of which define a unique DDD and are thus eligible for unique software upgrades from the NMC.

The present invention further includes a third preferred embodiment of a method for upgrading software on a mobile terminal that includes a first upgradeable component. The first upgradeable component could be, without limitation, an interface unit, a data modem, a personal digital assistant (PDA), a GPS receiver, a navigation system, a cellular mobile telephone, a satellite modem or a display. The method of the third preferred embodiment further includes the step of grouping the mobile terminal into a first group in response to a DDD of the first upgradeable component, wherein the DDD corresponds to operating characteristics of the first upgradeable component. The method of the third preferred embodiment further includes the step of replacing the first upgradeable component by a second upgradeable component, wherein the second upgradeable component includes a second DDD corresponding to operating characteristics of the second upgradeable component. The second upgradeable component could be, without limitation, an interface unit, a data modem, a personal digital assistant (PDA), a GPS receiver, a navigation system, a cellular mobile telephone, a satellite modem or a display. The method of the third preferred embodiment further includes the steps of upon replacement of the first upgradeable component by the second upgradeable component, transferring the mobile terminal from the first group into a second group, based on the new DDD, and upgrading the software on the mobile terminal in response to the second group being different than the first group. The step of upgrading the software on the mobile terminal can be transacted over a satellite link, as described above.

As in previous embodiments, the first and second DDD's could include designators for a hardware configuration, an operating system, a memory configuration or a processing configuration. Additionally, variations on this method can include the steps of transmitting from the mobile terminal one or both of the first and second DDD's to an NMC such that the NMC can appropriately group the mobile terminal in response to a different DDD.

Other variations of the method of the third preferred embodiment include providing a release manifest including a list of software components forming the software upgrade. As noted above, the release manifest is usable by the NMC to maintain current and accurate information regarding the software configuration of each of the plurality of software upgrades. Alternatively, the method can include the step of receiving the release manifest at the mobile terminal and compare it with an existing software package in order to determine the applicability and/or completeness of the software upgrade. In this manner, the mobile terminal is adapted to have information as to whether or not it is in receipt of a recent, applicable software upgrade. If the release manifest shows software packages that the mobile terminal does not have, then the mobile terminal is not completely up to date and is not ready to upgrade. In another alternative, the method can include the step of contacting the NMC by the mobile terminal to report the status of its existing software package not being fully complete, and can thus instruct the NMC to transmit or retransmit all or portions of the software upgrade that would complete the software package of the mobile terminal.

In a third variation of the method of the third preferred embodiment, the method can include the step of providing an upgrade time and transmitting the upgrade time to the mobile terminal. As noted above, the upgrade time includes at least the software release number, a time at which the software should be upgraded, and the DDD to which it applies. The upgrade time allows the mobile terminal to determine the timeliness of the software upgrade. For example, if the upgrade time is in the future, then the mobile terminal is adapted to refrain from executing the software upgrade until the predetermined time. If the upgrade time is in the past, then the mobile terminal is adapted to execute the software upgrade at the nearest available time, which can be subject to other constraints such as whether one or more of the upgradeable devices is in use when the upgrade time is received.

If the DDD designated in the upgrade time and/or the DDD in the release manifest do not match the DDD of the upgradeable device, then the mobile terminal can perform the optional step of ignoring the software upgrade. In order to ensure the security and functionality of the software upgrade, the method can further include the step of utilizing a digital signature to authenticate the upgrade to the mobile terminal.

In another variation of the third method of the preferred embodiment, the method includes the step of monitoring an active state of the mobile terminal. As used herein, the term active state should be construed broadly to include both operational states as well as passive states, wherein one or more functions of an upgradeable component are in use thereby preventing a reboot of some or all of the upgradeable components of the mobile terminal. For example, a navigation system can be in a passive state that is nevertheless active because one or more features of the navigation system are functioning, such as communications with one or more GPS satellites. On the other hand, if these features of the navigation system are not functioning, then it can be said to be in a negative active state as defined herein.

The method of the present invention also includes a fourth preferred embodiment including the steps providing the mobile terminal with an upgradeable component and providing beta software operable on the upgradeable component. The method of fourth preferred embodiment further includes the steps of grouping the upgradeable component into a beta group; and populating a database of the upgradeable component with beta software in response to the grouping of the upgradeable component.

As in prior preferred embodiments, the upgradeable component can be, for example, an interface unit, a data modem, a personal digital assistant (PDA), a GPS receiver, a navigation system, a cellular mobile telephone, a satellite modem or a display.

Once beta testing of the software is complete, variations of the method of the fourth preferred embodiment include the step of removing the beta designation from the beta software. This step can be performed at the NMC, and subsequent to the removal of the beta designation, the mobile terminal can be grouped into another software group in accordance with the methods described herein with reference to a DDD associated with the upgradeable component.

Figure 2:
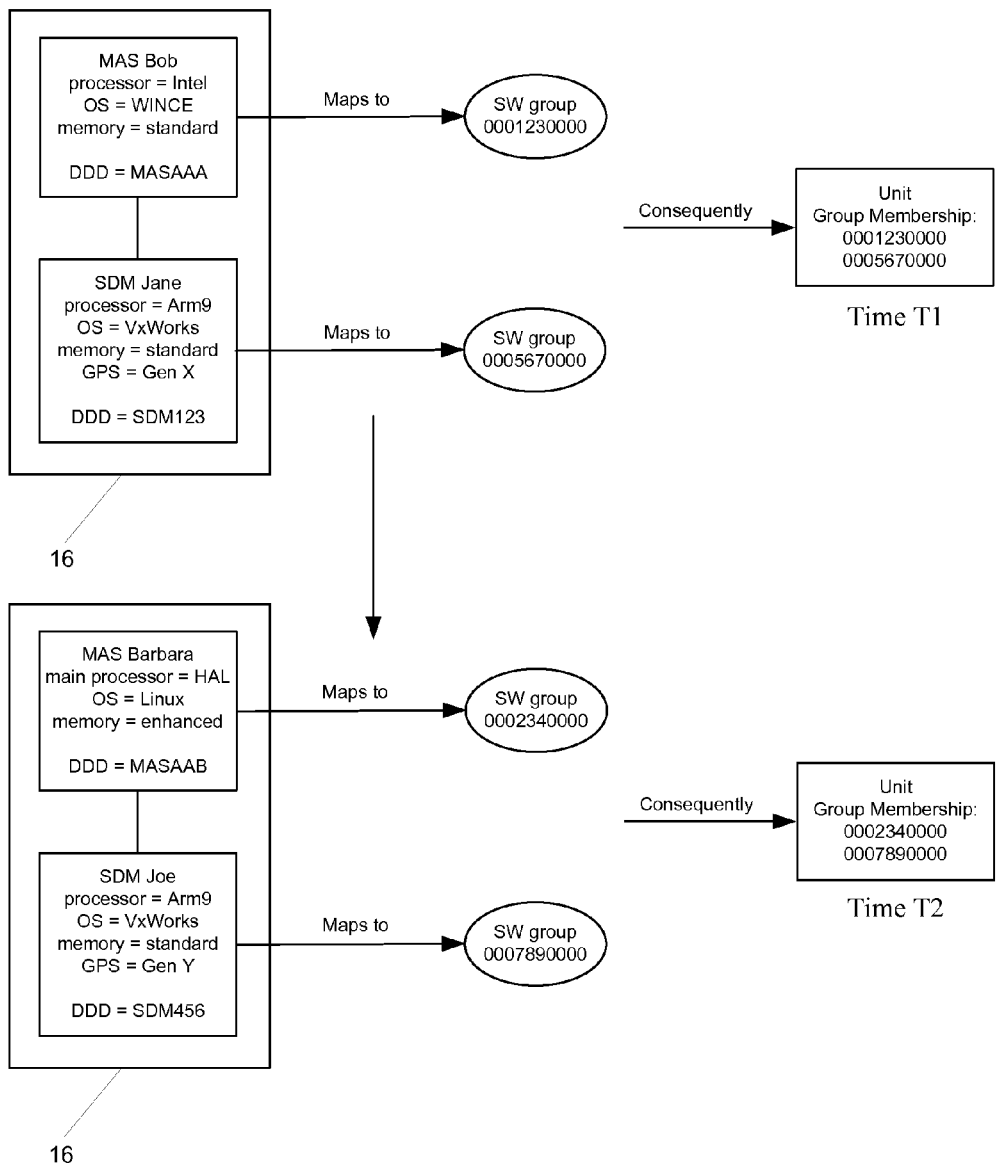
FIG. 2 is a schematic block diagram illustrating a method for upgrading software on a mobile terminal in accordance with a preferred embodiment of the present invention.

The methods of the preferred embodiments can be used in many instances, such as, for example, in the introduction of a new upgradeable component after the passage of time. For example, FIG. 2 illustrates a mobile terminal 16 at a time T1 and at a later time T2. At time T1, the mobile terminal 16 includes a Mobile Applications Server (MAS) and a Satellite Data Modem (SDM) having defined processors, operating systems and memory. Accordingly, the MAS at time T1 has a DDD of MASAAA, and the SDM at time T1 has a DDD of SDM123. Each of these DDD's maps to a software group. The MAS is in the group 0001230000 and the SDM is in the group 0005670000. Membership in both of these groups constitutes a unit group membership for the mobile terminal 16. According to the methodology of the preferred embodiments, the mobile terminal 16 will only receive software updates in accordance with its unit group membership, which as detailed above, is defined at least in part by the DDD of its respective upgradeable components.

Continuing with FIG. 2, at time T2 the upgradeable components of the mobile terminal 16 have been changed. In this instance, the MAS has a DDD of MASAAB, which maps to software group 0002340000. The SDM has a DDD of SDM456, which maps to software group 0007890000. As such, the unit group membership of the mobile terminal 16 is changed as shown in FIG. 2, and the mobile terminal 16 will now receive software upgrades in accordance with its new unit group membership. Software upgrades for the previous unit group membership will no longer be directed to the mobile terminal 16.

Figure 3:
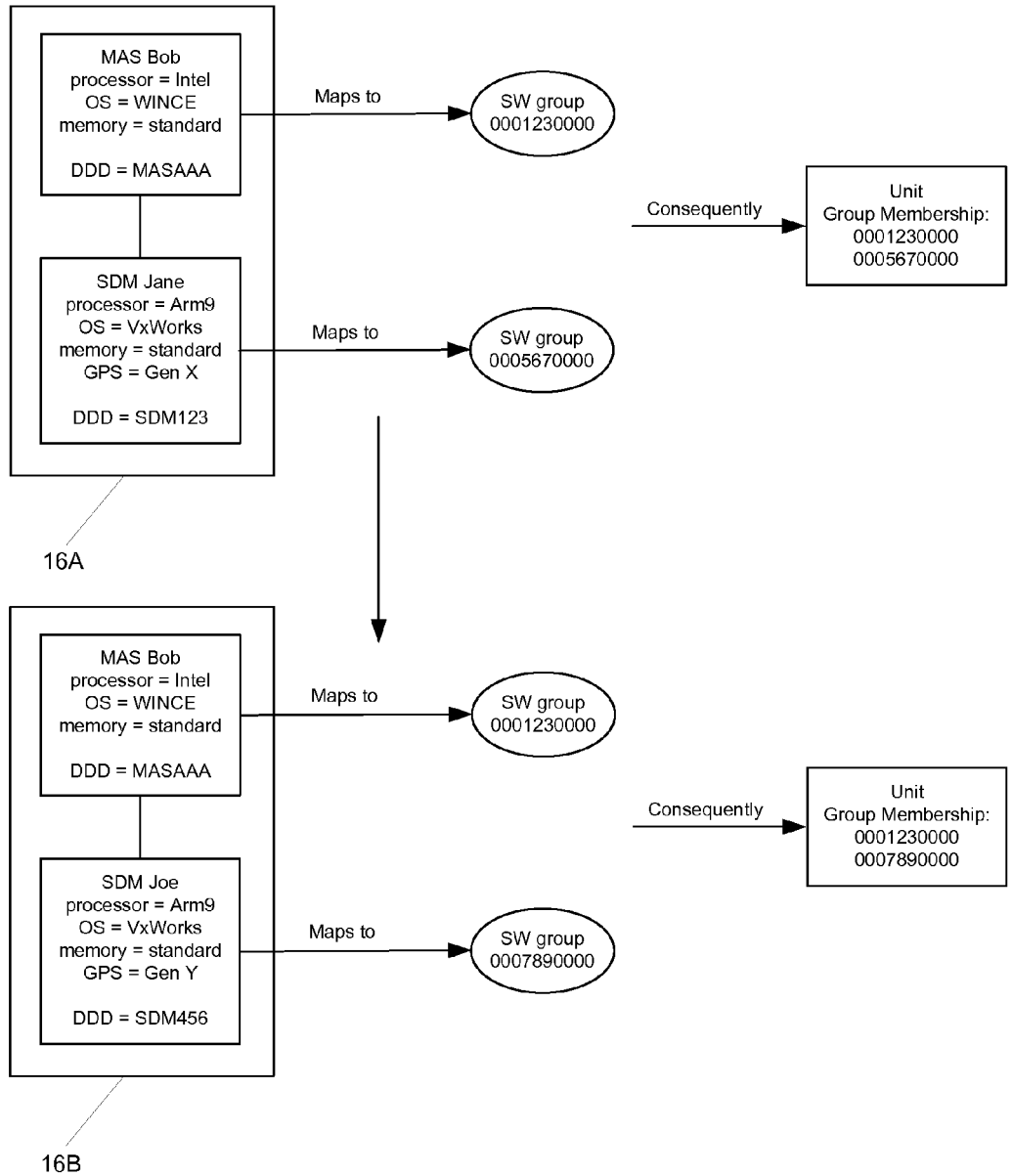
FIG. 3 is a schematic block diagram illustrating a method for upgrading software on a mobile terminal in accordance with a preferred embodiment of the present invention.

Similarly, FIG. 3 is illustrative of the methodology of the preferred embodiments in an instance in which one upgradeable component of the mobile terminal 16 is changed. In mobile terminal 16A, the upgradeable components are the MAS and the SDM, having respective DDD's of MASAAA and SDM123. As in FIG. 2, the DDD's of the upgradeable components map to particular software groups, which in turn define a unit group membership for the mobile terminal 16A.

If the mobile terminal 16 is altered in some manner, such as the replacement of the SDM, then a new mobile terminal 16B is created. Although the MAS of the mobile terminal 16B still maps to the same software group, the SDM has a next generation GPS unit, which gives it a different DDD of SDM456. Accordingly, the SDM is mapped to a new software group 0007890000, which in turn causes the unit group membership of the mobile terminal 16B to change as shown in FIG. 3. As in the prior example, once the unit group membership has been changed, the mobile terminal 16B will no longer receive software upgrades that are designed for the prior unit group membership.

Figure 4:
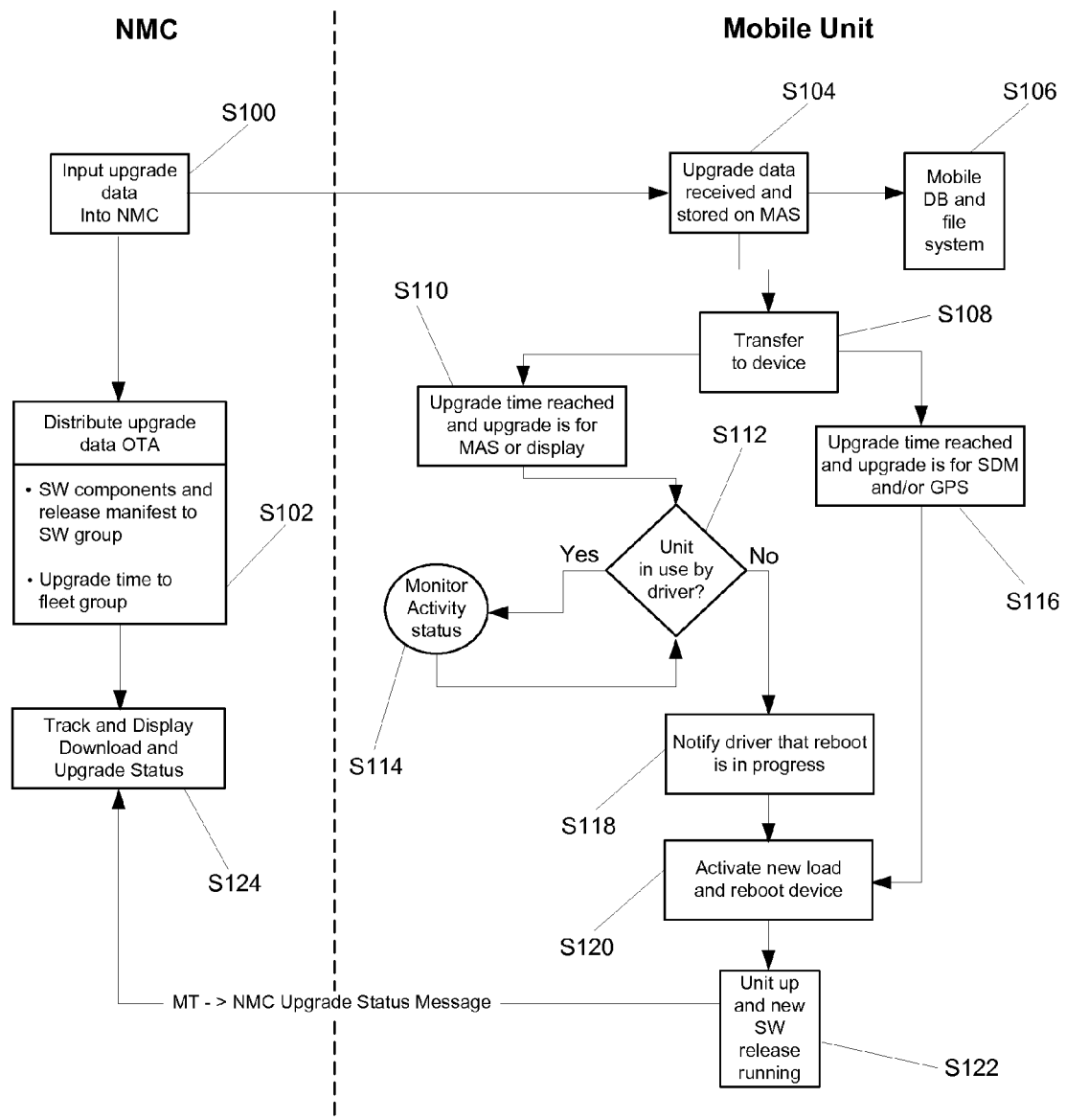
FIG. 4 is a flow chart depicting a method for upgrading software on a mobile terminal in accordance with a preferred embodiment of the present invention.

Another example methodology for performing aspects of the preferred method of the present invention is shown in the flowchart of FIG. 4, which can be used for example in a mobile terminal incorporated into a vehicle, such as a shipping or freight truck. The example method begins at step S100, in which the upgrade data is input into the NMC. In step S102, the upgrade data, including software components, release manifest and upgrade time, is distributed over the air, for example through a satellite link, to the software group and/or fleet group. Receiving the upgrade data is the mobile terminal in step S104, which stores it locally on one of its mobile databases in step S106. In step S108, the upgrade data is transferred to the target device, e.g. the upgradeable component that is in need of the software update.

The example method shown in FIG. 4 distinguishes between types of upgradeable components in its upgrading of the software. If the upgradeable component is for example a data modem or a GPS unit, then the upgrade time is determined in step S116. Once the upgrade time has been reached, the example method proceeds to step S120, in which the new software is activated and the upgradeable component is rebooted. In step S122, the example method checks whether the upgradeable component is operational and the new software is running, with that information fed back to the NMC in step S124 for constant tracking and monitoring of the software upgrade status.

If the upgradeable component is for example an interface unit or a display, then the upgrade time is determined in step S110. As noted before, certain types of software upgrades can necessitate a reboot of the mobile terminal, which can affect the performance of the mobile terminal if it is in use. Accordingly, in step S120, the example method checks whether the unit is in use by a driver, for example. If the unit is in use, then the example method proceeds to step S114, which performs monitoring as to the active status of the unit. If the unit is not in use, then the example method proceeds to step S118, in which the driver is notified that a reboot is in progress. Following notification of the user/driver, the example method proceeds to steps S120, S122 and S124, described above, in which the software upgrade is activated and its status monitored by the NMC.

Figure 5:
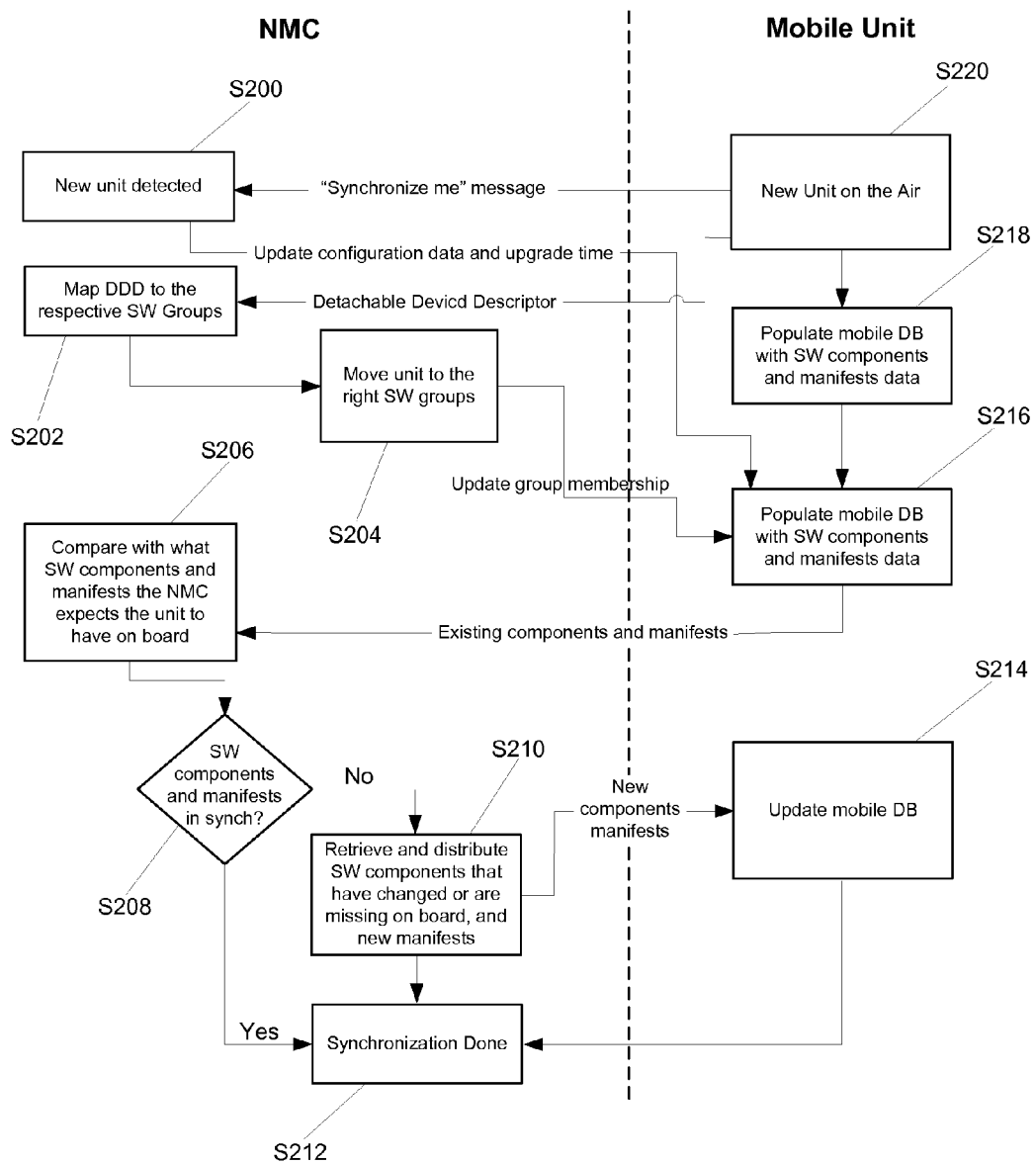
FIG. 5 is a flow chart depicting a method for upgrading software on a mobile terminal in accordance with a preferred embodiment of the present invention.

Another example methodology for performing aspects of the preferred methods of the present invention is shown in the flowchart of FIG. 5, which can be used for example in the introduction of a new mobile terminal (unit) and the process by which its software is updated. Beginning in step S220, the new unit identifies itself to the NMC, which detects the new unit at step S200. In step S220, the new unit further transmits its DDD to the NMC, which the NMC maps to the respective software groups in step S202. In step S218, the new unit populates its database with its current software components and manifest data, which is then transmitted to the NMC in step S216. In step S204, the NMC moves the new unit into the appropriate software group, as discussed above, in response to its DDD and transmits the group membership to the new unit in step S216.

In step S206, the NMC compares the existing software components and manifest data transmitted by the new unit to the software components and manifest data defined by the new unit's group membership. In step S208, the NMC checks to see if the new unit's software components and manifest data are synchronized with the relevant specifications for its group. If the new unit is synchronized with its group membership, then the example method ends in step S212. However, if the new unit lacks software components, software updates and/or manifest data, then the NMC transmits the appropriate items to the new unit in step S210. In step S214, the new unit updates its database with the appropriate software and manifest data according to the methods of the preferred embodiments, at which time it is properly synchronized with its group membership.

Figure 6:
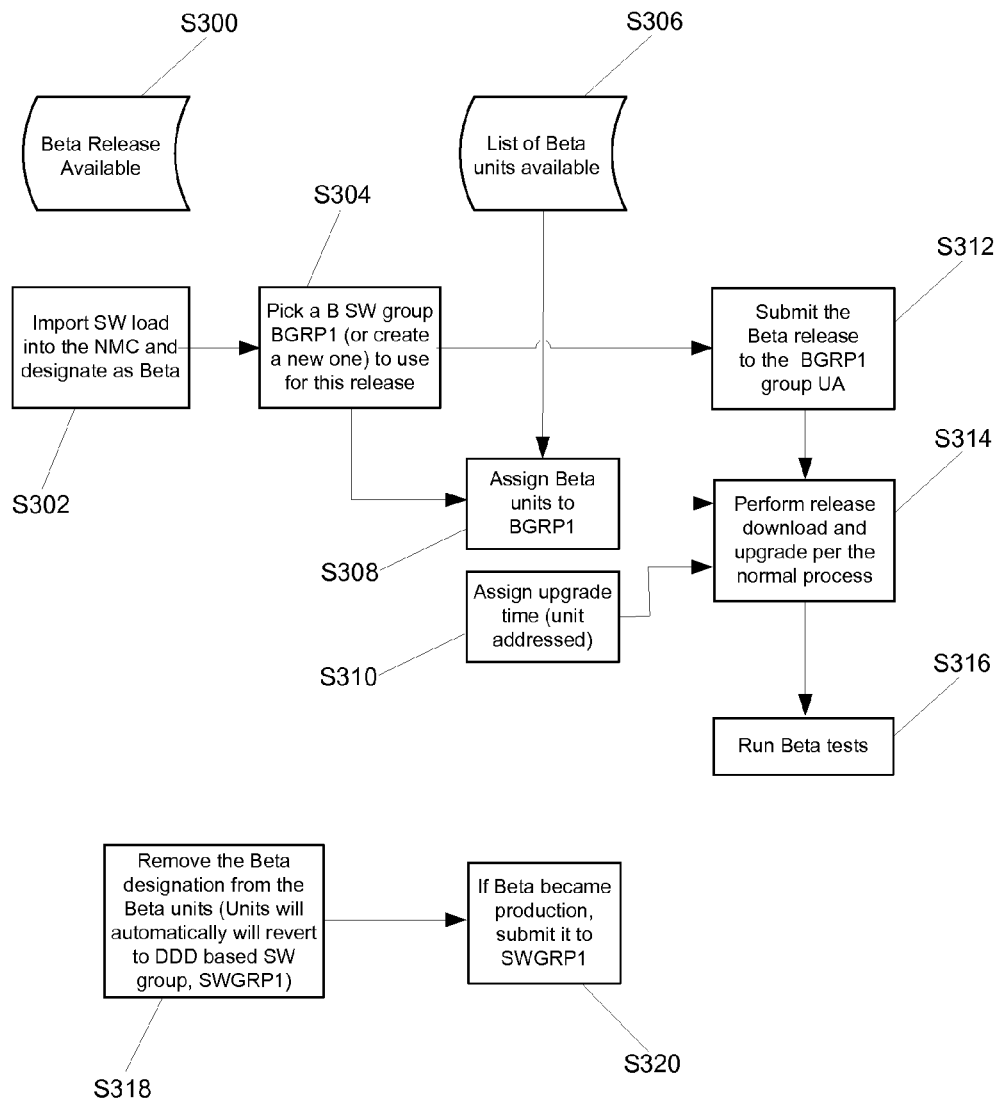
FIG. 6 is a flow chart depicting a method for upgrading software on a mobile terminal in accordance with a preferred embodiment of the present invention.

Another example methodology for performing aspects of the preferred methods of the present invention is shown in the flowchart of FIG. 6, which can be used for example in the introduction and testing of beta software on a mobile terminal. In step S300, a beta release of a software program becomes available, and in step S302, it is imported into the NMC and designated as a beta release. In step S304, the example method includes defining a beta group for the release. In step S306, a list of available beta units, or mobile terminals available for beta testing the software, is made available, and some or all of the beta units are incorporated into the beta group at step S308. An upgrade time, defined above, is assigned at step S310. In step S312, the beta release is submitted to the beta group, and in step S314, the beta software is transmitted and uploaded onto the mobile terminal in accordance with the methods of the preferred embodiments. In step S316, the beta tests are run on the mobile terminals that form the beta group.

Following completion of the beta testing period in step S318, the beta designation can be removed from the software by the NMC, in which case the mobile terminals will revert to their standard software group in accordance with their DDD prior to the beta testing period. If, however, the beta software becomes the new standard software for the mobile terminals, then the beta software becomes a part of the software group for the mobile terminals as shown in step S320.

Although the invention has been described in detail with particular reference to these preferred embodiments and example implementations, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

We claim:

1. A system for upgrading software on a mobile terminal, comprising:
   a network management computer (NMC) adapted to receive a plurality of software upgrades and to transmit one of the plurality of software upgrades to one of a plurality of mobile terminals; and
   a mobile terminal that is communicable with the NMC and is adapted to execute a software program, the mobile terminal including an upgradeable component, wherein the upgradeable component further comprises a detachable device descriptor (DDD) corresponding to at least one operating characteristic of the upgradeable component;
   wherein the NMC is adapted to transmit the one of the plurality of software upgrades to the mobile terminal in response to the DDD of the upgradeable component, and
   wherein the DDD maps to a software group and the mobile terminal receives the one of the plurality of software upgrades based at least on the mapping to the software group.

2. The system of claim 1, wherein the upgradeable component includes at least one of an interface unit, a data modem, a personal digital assistant, a GPS receiver, a navigation system, a cellular mobile telephone, a satellite modem, and a display.

3. The system of claim 2, wherein the mobile terminal further comprises a second upgradeable component comprising a second DDD, and further wherein the second upgradeable component includes at least one of an interface unit, a data modem, a personal digital assistant, a GPS receiver, a navigation system, a cellular mobile telephone, a satellite modem, and a display.

4. The system of claim 1, wherein the DDD includes a designation corresponding to at least one of a hardware configuration, an operating system, a memory configuration, and a processing configuration.

5. The system of claim 1, wherein the one of the plurality of software upgrades comprises a release manifest, and the release manifest comprises a list of software components.

6. The system of claim 5, wherein the mobile terminal is adapted to receive the release manifest and further adapted to compare the release manifest with an existing software package such that a completeness of the software upgrade is determinable.

7. The system of claim 1, wherein the one of the plurality of software upgrades includes an upgrade time.

8. The system of claim 7, wherein the mobile terminal is adapted to receive the upgrade time such that a timeliness of the software upgrade is determinable.

9. The system of claim 1, wherein the NMC is further adapted to multicast the one of the plurality of software upgrades to two or more of the plurality of mobile terminals based at least on the mapping to the software group.

10. A method for receiving a software upgrade at a mobile terminal, comprising:
    identifying, at the mobile terminal, a detachable device descriptor (DDD) corresponding to at least one operating characteristic of an upgradeable component on the mobile terminal;
    transmitting the DDD to a network entity; and
    receiving the software upgrade at the mobile terminal in response to the transmitting of the DDD, wherein the DDD maps to a software group and the mobile terminal receives the software upgrade based at least on the mapping to the software group.

11. The method of claim 10, wherein the upgradeable component comprises one or more of an interface unit, a data modem, a personal digital assistant, a GPS receiver, a navigation system, a cellular mobile telephone, a satellite modem, and a display.

12. The method of claim 10, wherein the DDD includes a designation corresponding to at least one of a hardware configuration, an operating system, a memory configuration, and a processing configuration.

13. The method of claim 10, further comprising receiving a release manifest including a list of software components comprising the software upgrade.

14. The method of claim 13, further comprising:
    comparing the release manifest with an existing software package such that a completeness of the software upgrade is determinable.

15. The method of claim 10, further comprising:
    receiving an upgrade time; and
    determining, at the mobile terminal based on the upgrade time, a timeliness of the software upgrade.

16. The method of claim 10, further comprising determining an active state of the mobile terminal.

17. The method of claim 16, further comprising notifying a user of the mobile terminal that a reboot of the mobile terminal is in response to determining that the active state of the mobile terminal is a negative active state.

18. The method of claim 10, wherein the receiving of the software upgrade comprises receiving via a multicast.

19. A method executable by a network management computer (NMC) for upgrading software on a mobile terminal, wherein the mobile terminal comprises an upgradeable component, comprising:
    identifying, at the NMC, a detachable device descriptor (DDD) corresponding to at least one operating characteristic of the upgradeable component;
    populating a database including the upgradeable component with original data corresponding to existing software on the upgradeable component;

grouping the mobile terminal into a group of one or more mobile terminals in response to the DDD of the upgradeable component;
comparing the original data of the upgradeable component to upgrade data corresponding to the group of one or more mobile terminals; and
providing a software upgrade to the mobile terminal in response to the original data and the upgrade data being unsynchronized and based at least on the grouping.

20. The method of claim 19, further comprising receiving the DDD of the upgradeable component from the mobile terminal.

21. The method of claim 19, wherein the upgradeable component comprises at least one of an interface unit, a data modem, a personal digital assistant, a GPS receiver, a navigation system, a cellular mobile telephone, a satellite modem, and a display.

22. The method of claim 19, wherein the DDD comprises a designation for at least one of a hardware configuration, an operating system, a memory configuration, and a processing configuration.

23. The method of claim 19, further comprising providing a release manifest including a list of software components comprising the software upgrade.

24. The method of claim 23, further comprising:
transmitting the release manifest to the mobile terminal to enable comparing the release manifest with an existing software package such that a completeness of the software upgrade is determinable.

25. The method of claim 19, further comprising:
providing an upgrade time; and
transmitting the upgrade time to the mobile terminal such that a timeliness of the software upgrade is determinable.

26. The method of claim 19, wherein providing the software upgrade further comprises multicasting to two or more of the group of one or more mobile terminals based at least on the DDD of the upgradeable component corresponding to the group.

27. A method executable by a network entity for upgrading software on a mobile terminal, comprising:
identifying a first upgradeable component of the mobile terminal, wherein the first upgradeable component comprises one of an interface unit, a data modem, a personal digital assistant, a GPS receiver, a navigation system, a cellular mobile telephone, a satellite modem, and a display, and wherein the first upgradeable component further corresponds to a first detachable device descriptor (DDD) corresponding to at least one operating characteristic of the first upgradeable component;
grouping the mobile terminal into a first group of at least one mobile terminal in response to the DDD of the first upgradeable component;
identifying a second upgradeable component as a replacement for the first upgradeable component, the second upgradeable component comprising one of a second interface unit, a second data modem, a second personal digital assistant, a second GPS receiver, a second navigation system, a second cellular mobile telephone, a second satellite modem, and a second display, and further comprising a second DDD corresponding to at least one operating characteristic of the second upgradeable component;
grouping the mobile terminal into a second group of at least one mobile terminal based on the second DDD upon replacement of the first upgradeable component by the second upgradeable component;
determining whether the first group and the second group comprise different groups; and
upgrading the software on the mobile terminal in response to determining that the second group is different than the first group and based at least on the grouping of the mobile terminal into the second group.

28. The method of claim 27, wherein the first DDD and the second DDD each include at least one designation corresponding to at least one of a hardware configuration, an operating system, a memory configuration, and a processing configuration.

29. The method of claim 28, further comprising receiving the first DDD from the mobile terminal, and wherein the grouping of mobile terminal into the first group occurs prior to replacement of the first upgradeable component.

30. The method of claim 28, further comprising receiving the second DDD from the mobile terminal, and wherein the grouping of the mobile terminal into the second group occurs subsequent to replacement of the first upgradeable component.

31. The method of claim 27, further comprising providing a release manifest including a list of software components comprising the software upgrade.

32. The method of claim 31, further comprising:
transmitting the release manifest to the mobile terminal to enable comparing the release manifest with an existing software package such that a completeness of the software upgrade is determinable.

33. The method of claim 27, further comprising:
providing an upgrade time; and
transmitting the upgrade time to the mobile terminal such that a timeliness of the software upgrade is determinable.

34. The method of claim 27, wherein upgrading the software further comprises multicasting to two or more of the second group based at least on the second DDD of the second upgradeable component corresponding to the second group.

35. A method for upgrading software on a mobile terminal, wherein the mobile terminal comprises an upgradeable component, comprising:
providing the mobile terminal with an upgradeable component;
providing beta software operable on the upgradeable component;
grouping, at a network management computer (NMC), the upgradeable component into a beta group;
populating a database of the upgradeable component with the beta software in response to the grouping of the upgradeable component; and
grouping the mobile terminal into a group of one or more mobile terminals in response to a removal of a beta designation from the beta software.

36. The method of claim 35, wherein populating the database of the upgradeable component further comprises transmitting the beta software from the NMC to the upgradeable component.

37. The method of claim 35, wherein the upgradeable component includes one of an interface unit, a data modem, a personal digital assistant, a GPS receiver, a navigation system, a cellular mobile telephone, a satellite modem, and a display.

38. The method of claim 35, further comprising removing the beta designation from the beta software.

39. The method of claim 35, wherein grouping the mobile terminal into the group further comprises grouping the mobile terminal into the group based on a detachable device descriptor (DDD) of the upgradeable component.

40. The method of claim 39, further comprising providing a software update, via multicast, to two or more of the group of mobile terminals based at least on mapping the software upgrade to the DDD and to the group.

* * * * *